United States Patent [19]

Hanaoka

[11] 4,369,477

[45] Jan. 18, 1983

[54] MAGNETIC HEAD AND METHOD OF MANUFACTURING THE SAME

[75] Inventor: Naohiro Hanaoka, Hachioji, Japan

[73] Assignee: Olympus Optical Co., Ltd., Tokyo, Japan

[21] Appl. No.: 151,468

[22] Filed: May 19, 1980

[30] Foreign Application Priority Data

May 24, 1979 [JP] Japan .................................. 54-64231

[51] Int. Cl.³ ........................... G11B 5/16; G11B 5/12
[52] U.S. Cl. ...................................... 360/126; 360/125
[58] Field of Search ............... 360/123, 124, 125, 126, 360/118

[56] References Cited

U.S. PATENT DOCUMENTS

| | | | |
|---|---|---|---|
| 4,052,749 | 10/1977 | Nomura | 360/123 |
| 4,115,827 | 9/1978 | Gooch | 360/125 |
| 4,149,205 | 4/1979 | Berghof | 360/123 |

OTHER PUBLICATIONS

IBM Technical Disclosure Bulletin, vol. 15, No. 7, Dec., 1972, p. 2182, "Electromagnetic Transducer With Thin-Film Pole Pieces", A. Paton.
IBM Technical Disclosure Bulletin, vol. 7, No. 11, Apr., 1965, p. 993, "Fabrication of Narrow Track Width, High-Density Ferrite Head", Frost et al.

Primary Examiner—Robert M. Kilgore
Attorney, Agent, or Firm—Frishauf, Holtz, Goodman & Woodward

[57] ABSTRACT

A magnetic head characterized by comprising:
a first half including a first block made of a ferromagnetic material and a second block made of a non-magnetic material jointed to said first block, said first half being formed with a notch separating at least said second block;
a ferromagnetic first thin film formed on a surface of said first half containing one surface of each of said first and second blocks and having a bay defined by said notch;
a ferromagnetic second thin film and a non-magnetic third thin film formed on said first thin film which are opposite to each other with said bay therebetween;
a second half forming a core block with said first half, which is fitted to said first half so that said first, second and third thin films are sandwiched between said first and second halves, and which has at least a non-magnetic portion opposite to said second block, and which is formed with a notch opposite to said notch of said first half; and
a magnetic flux detecting means provided at a magnetic path constituted by said core block including said first block, wherein a magnetic flux based upon a magnetic potential difference between a magnetic potential given from a magnetic recording medium to a portion of said first thin film in contact with said third thin film and a magnetic potential given from said magnetic recording medium to said second thin film at the end face of said core block on said second block side and separated by said notch is converted into an electric signal by said magnetic flux detecting means.

13 Claims, 19 Drawing Figures

MAGNETIC HEAD AND METHOD OF MANUFACTURING THE SAME

BACKGROUND OF THE INVENTION

This invention relates to a method of manufacturing a magnetic head used for the playback of a magnetic tape such as a magnetic tape recorded with a vertical magnetization recording system, and also to a magnetic head manufactured by the same method.

In a vertical magnetization recording system, in which a magnetic thin film is magnetized in a direction normal to the surface thereof, a magnetic thin film tape having magnetic anisotropy in a direction normal to its surface is used as a recording medium. In this recording system, magnetization of the recording medium in the direction normal to its surface is effected without self-demagnetization by a demagnetizing field. Thus, this system permits recording of information at a very high density compared to the case of the conventional horizontal or surface direction recording system. In this vertical recording system, the method of recording information on a magnetic tape is considerably different from that in the horizontal or surface direction recording system. For this reason, a head having a novel construction has been developed as the recording head for the vertical recording system. Hitherto, however, an ordinary ring-like head has been used as the reproducing head.

With the prior ring-like reproducing head, however, the reduction of or narrowing of the gap width is restricted by the reproduction efficiency. With the prior-art ring-like head, therefore, difficulties are involved in the reproduction of information of very short wavelengths. Also, even if one tries to reduce the gap width while ignoring the reproduction efficiency, it is impossible to make the gap width extremely narrow due to restrictions imposed on processing techniques. When processing a very narrow gap section, the magnetic permeability of the magnetic material of the head in a high frequency region is reduced by this processing. This means that the gap width is increased in practice. In other words, even if a gap of a mechanically narrow size is merely produced, the effective gap width is not exactly as narrow as that size. Further, when the gap width is made narrow, the surface roughness of the gap section becomes noticeable. This surface roughness is a factor in increasing the effective gap width. The lower limit of the effective gap width that is obtainable with the prior-art processing techniques is about 1 $\mu$m.

With the vertical magnetization recording system, it is possible to obtain a very high information recording density. With the prior-art ring-like reproducing head, however, it is hard to obtain an effective gap width smaller than 1 $\mu$m due to the afore-mentioned reasons, so that the recorded information with very high density cannot be reproduced. In other words, the frequency range of reproduction is narrower than that of recording. If it is intended to extend the frequency range of reproduction, very difficult processing techniques are required with the prior-art ring-like head.

SUMMARY OF THE INVENTION

An object of the invention is to provide a method of manufacturing a magnetic head for the vertical magnetization recording system, which is realized with comparatively easy processing techniques and which is capable of reproducing very short wavelengths, and also to provide a wide frequency coverage type magnetic head which is obtainable by this method.

To achieve the above object, the magnetic head according to the invention has a construction, which comprises a first half (16) including a first block (10) made of a ferromagnetic material and a second block (12) made of a non-magnetic material jointed to the first block (10), said first half (16) being formed with a notch (32) separating at least said second block (12); a ferromagnetic first thin film (18) formed on a surface of said first half (16) containing one surface of each of said first (10) and second (12) blocks and having a bay defined by the notch (32); a ferromagnetic second thin film (20) and a non-magnetic third thin film (22) formed on said first thin film (18) which are opposite to each other with the bay therebetween; a second half (26) forming a core block (34) with the first half (16), which is fitted to the first half (16) so that the first, second and third thin films (18, 20, 22) are sandwiched between the first (16) and second (26) halves, and which has at least a non-magnetic portion opposite to the second block (12), and which is formed with a notch opposite to the notch (32) of the first half (16); and a magnetic flux detecting means (36) provided at a magnetic path constituted by the core block (34) including the first block (10). A magnetic flux based upon a magnetic potential difference between a magnetic potential given from a magnetic recording medium (56) to a portion of the first thin film (18) in contact with the third thin film (22) and a magnetic potential given from the magnetic recording medium (56) to the second thin film (20) at the end of the core block (34) on the second block (12) side separated by the notch (32) is converted into an electrical signal by the magnetic flux detecting means (36).

In FIG. 11, the magnetic potential difference is produced by the gap or distance $W_g$ between the left side end position of the upper thin film $18_1$ and the left side end position of the lower thin film 20. Thus, a magnetic pattern $\phi_i$ at a position shifted by the distance $W_g$ is picked up. The magnetic patterns $\phi_i$ are magnetized over full width of the tape at right angles to the transport direction of the tape 56. In other words, the distance $W_g$ corresponds to the gap width in the prior-art ring-like head. This distance $W_g$ corresponds to the film thickness t20 of the thin film 20. In other words, the practical resolution of the magnetic head 54 according to the invention is determined by the film thickness t20. As mentioned earlier, as the film thickness t20, it is possible to realize a very small thickness of the order of a fraction of a micron by the film thickness control. Thus, it is possible to achieve reproduction of short wavelength information, which has been almost impossible in practice with a prior-art ring-like head.

The ferromagnetic thin film portion for detecting the magnetic potential difference produced in the tape (i.e., the thin film $18_1$ and thin films $18_2$ and 20 in FIG. 11) can be formed by a suitable method such as sputtering, with which the thickness control can be comparatively readily made. Thus, high precision machining techniques as required in the case of forming the gap of the ring-like head are unnecessary, so that the head can be readily manufactured.

Further, the thin film portion for detecting the magnetic potential difference produced in the tape may, if necessary, be annealed in the state of the block as shown in FIG. 4. At this time, the reduction of the magnetic permeability is very slight compared to the reduction due to the machining strain in the gap section in the ring-like head.

DETAILED DESCRIPTION OF THE PREFERRED EMBODIMENT

Figure 1:
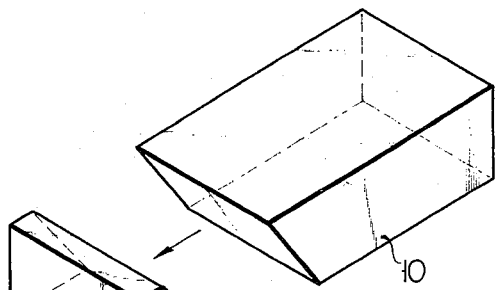
FIGS. 1 to 9 are views for illustrating an embodiment of the method of manufacturing a magnetic head according to the invention.

Now, a method of manufacturing a magnetic head according to the invention and a magnetic head manufactured by this method will be described with reference to the accompanying drawings. For brevity of description, like parts in the drawings are designated by like reference numerals, and repetition of description is avoided.

Figure 2:
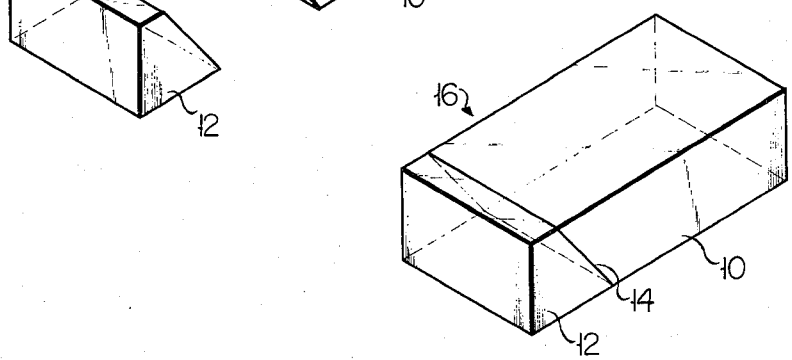
Figure 3:
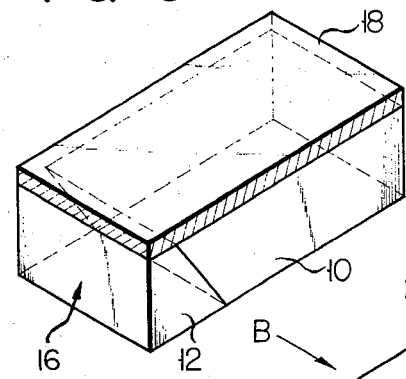

As shown in FIG. 1, a ferromagnetic block 10 and a non-magnetic block 12, which are respectively cut to predetermined sizes, are prepared. For the block 10 an oxide ferromagnetic material ($M^{II}O$ type) such as ferrite may be used, and for the block 12 a ceramic material having similar physical properties may be used. The blocks 10 and 12 have respective obliquely cut surfaces, which are bonded together via an adhesive layer 14 as shown in FIG. 2 to produce a rectangular first half 16 of a block assembly. As the adhesive, glass or an organic adhesive material may be used. Then, as shown in FIG. 3, a ferromagnetic thin film 18 is formed on the upper surface of the first half 16, in which the block 10 occupies a greater area than is occupied in the opposite side surface. This film 18 may be formed by such means as plating, vapor deposition, sputtering and the like. The thin film 18 may be made of Permalloy, Sendust (5% Al, 10% Si, 85% Fe), amorphous magnetic alloys and the like. The material of thin film 18 is desirably high in saturation magnetic flux density and magnetic permeability. The outer surface of the thin film 18 is surface ground to provide a smooth surface.

Figure 4:
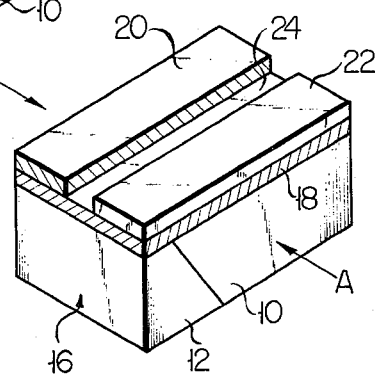

As shown in FIG. 4, a ferromagnetic thin film 20 and a non-magnetic thin film 22 are formed on the grounded surface of the thin film 18. These thin films 20 and 22 may also be formed by plating or sputtering. The film 20 is formed by using a mask of a suitable size (not shown). Likewise, the thin film 22 is formed by using a mask. When forming the films 20 and 22, a boundary or separation zone 24 is formed between these films with suitable mask operation. This boundary zone 24 is provided for preventing the overlapping of the thin films 20 and 22. As for the order of forming these thin films, either film 20 or 22 may be formed first. The material of the thin film 20 may be the same as that of the thin film 18. As the material of the thin film 22, chromium (Cr) may, for instance, be used. The thin films formed on the first half 16 are provided with an annealing treatment, if necessary. When the annealing treatment is necessary, a high-melting glass, for instance, is used for the bonding of the blocks 10 and 12. When the thin films 18 and 20 are Permalloy, the annealing treatment is made in the following way. The first half 16 with the thin films 18, 20 and 22 is heated to a temperature above 1,000° C. in hydrogen gas and is then gradually cooled down. With this annealing treatment, the strain produced in the magnetic material at the time of the processing is removed.

Figure 4A:
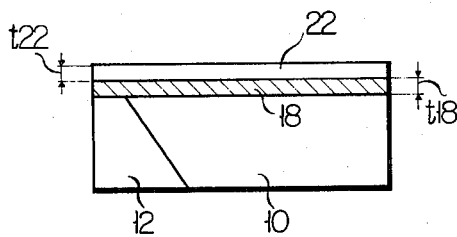
Figure 4B:
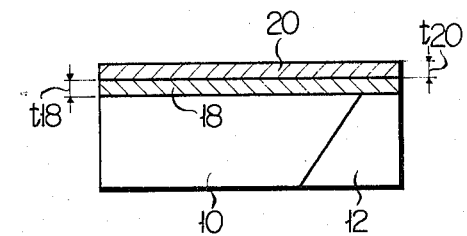

FIGS. 4A and 4B are side views of the first half 16 showing respectively in the directions of arrows A and B of FIG. 4. The thickness of the non-magnetic thin film 22 is labeled t22 in FIG. 4A, and the thickness of the ferromagnetic thin film 20 is labeled t20 in FIG. 4B. In these Figures, the thickness of the ferromagnetic thin film 18 is labeled t18. This film thickness t18 is greater than a few μm, and it is desirably as thick as possible. This is because if the thickness t18 is too small, the smoothness of the surface of the thin film 18 is influenced by the surface roughness of the first half 16. Providing a large thickness for the film 18 is also desirable from the standpoint of reducing the magnetic reluctance of the magnetic circuit around the gap. In practice, the film thickness t18 is several μm (10 μm at the most). The thickness t20 of the thin film 20, on the other hand, is very small; for instance it is set to one-half to one-third of a micron. If technically possible, the film thickness t20 may be further small (one-tenth of a micron being the practical lower limit). The thickness t22 of the thin film 22 is equal to the film thickness t20 as much as possible by the conventional film thickness control. In other words, such a control as to make the surfaces of the thin films 20 and 22 flat with each other is made.

Figure 5:
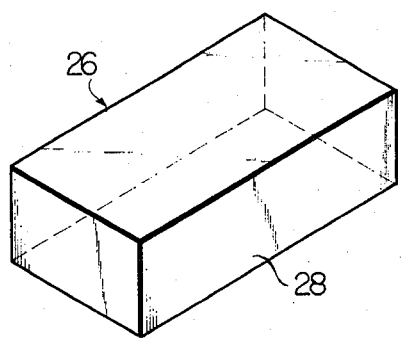
Figure 6:
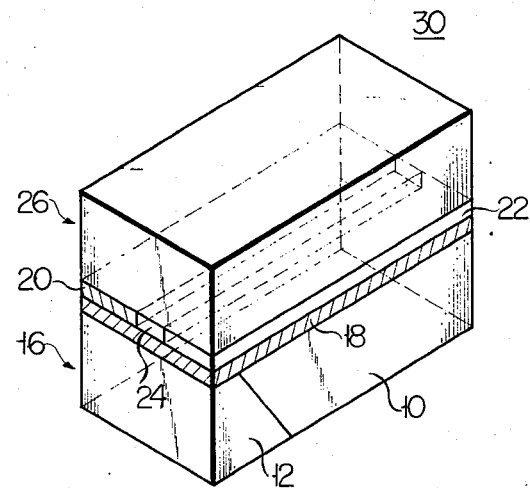

A second half 26 of the block assembly which is paired with the first half 16 is separately prepared. As shown in FIG. 5, the second half 26 has a rectangular shape like the first half 16. As is shown, a non-magnetic block 28 which is cut to a predetermined size similar to the blocks 10 and 12 is used as the second half 26. The block 28 is made from, for instance, a ceramic material. The second half 26 may, however, have a similar structure to the integral assembly of the blocks 10 and 12 as shown in FIG. 2. One surface of the second half 26 (lower surface in FIG. 5) is surface finished. As shown in FIG. 6, the second half 26 is bonded to the surfaces of the thin films 20 and 22 to obtain the block assembly 30. At this time, the grounded surface of the second half 26 is bonded to the surfaces of the thin films on the first half 16. For this bonding an organic adhesive or low-melting glass may be used.

Figure 7:
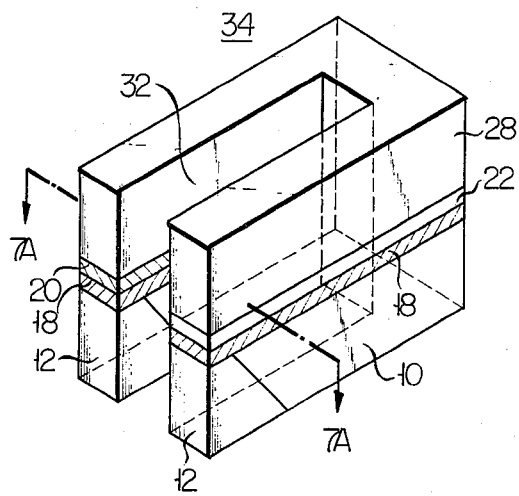
Figure 7A:
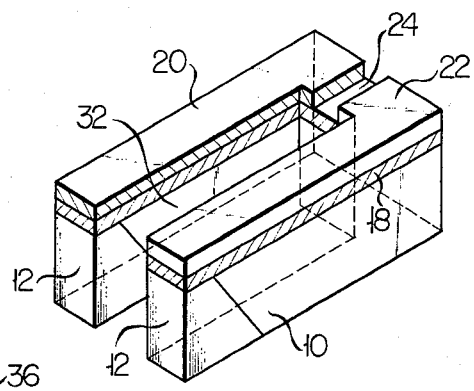
Figure 8:
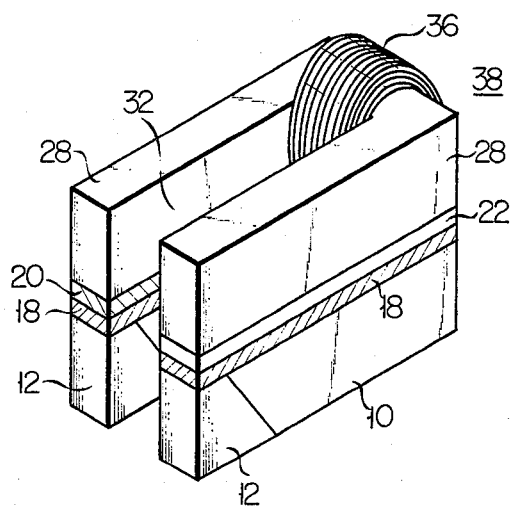

As shown in FIG. 7, the block assembly 30, which is an eventual core block, is provided, by a cutting work, with a central notch 32, which extends in the longitudinal direction of the boundary zone 24, i.e., along the boundary between the thin films 20 and 22, and has a width greater than that of the boundary zone 24, thus producing a U-shaped core block 34. FIG. 7A is a view showing the lower first half 16 of the core block taken along line 7A—7A in FIG. 7. The state of formation of the notch 32 will be more apparent from referring to FIG. 7A. As shown in FIG. 8, a coil 36 is wound on the central portion of the core block 34 defining the bottom of the notch 32. The core block 34 with the coil 36 wound thereon forms a magnetic circuit block 38.

Figure 9:
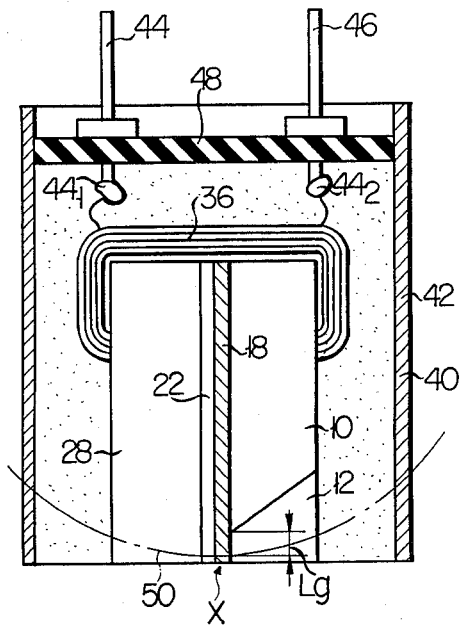

As shown in FIG. 9, the magnetic circuit 38 is fixed in position within a shield case 42 with a securement filler 40 such as an organic agent. Before the securement with the filler 40, the wiring ends of the coil 36 are soldered to terminals 44 and 46 at one of ends $44_1$ and $44_2$ thereof. The terminals 44 and 46 have been pressure fitted in an insulating plate 48 mounted on the shield case 42. Then, a curved surface 50 as shown by a broken line in FIG. 9 is formed by grinding as a head surface 50 which is to be in frictional contact with a magnetic tape. By this grinding, the distance Lg from the juncture between the blocks 10 and 12 bonded to the thin film 18 to the head surface 50 is adjusted. The distance Lg should not be zero, but it should not be too large. If the distance Lg is made too large, the magnetic reluctance of the magnetic circuit is increased to reduce the reproduction efficiency. On the other hand, if Lg is two small, the focus of the gap section X is broad so that the magnetic flux in portions spaced apart from the gap section X is likely to be caught, and much noise results. Consequently, there is a certain value as this distance Lg; it is suitably a few or several 10 μm (20 to 50 μm) although it depends upon the shape and size of the head. From the standpoint of efficiency, Lg is desirably less than 200 μm. The distance Lg is desirably as small as possible unless the aforementioned problems such as noise do not occur, but in practice it is selected to be about 50 μm to about 200 μm from the considerations of the limitations imposed by the present processing techniques and the problem of the wear resistance of the head.

Figure 10:
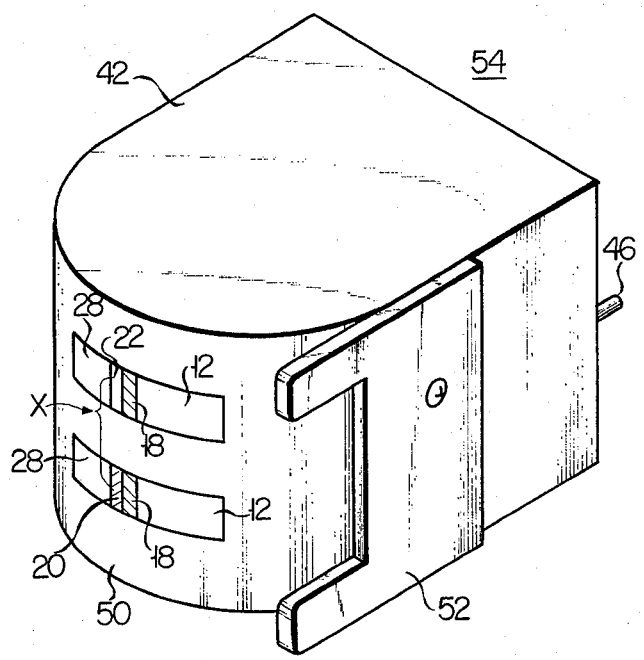
FIG. 10 is a perspective view showing the appearance of a magnetic head manufactured by the method according to the invention.
Figure 11:
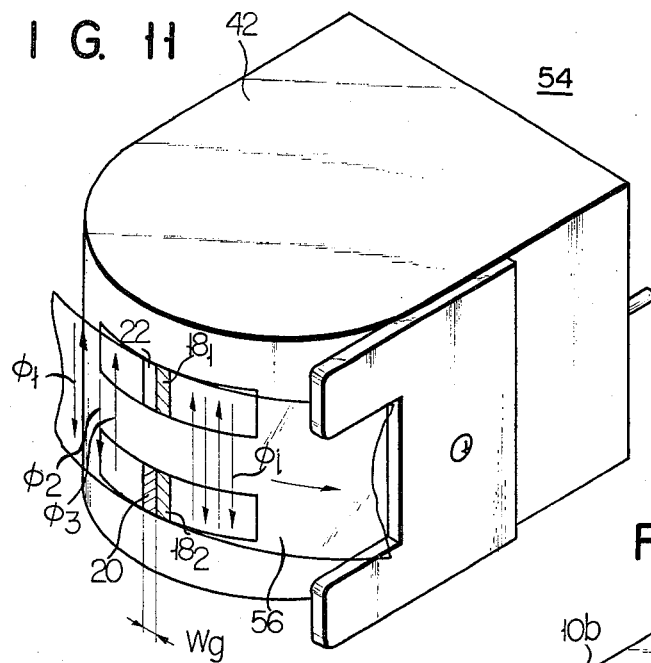
FIG. 11 is a view for illustrating the way in which recorded information recorded on a magnetic tape by the vertical magnetization recording system is reproduced by the magnetic head shown in FIG. 10.
Figure 12:
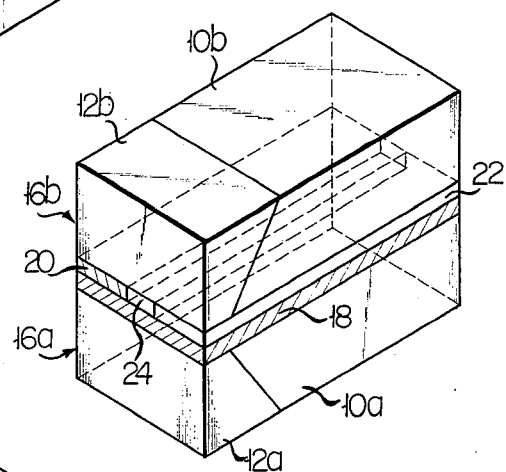
FIGS. 12 to 15 are views showing a modification of the construction shown in FIGS. 6 to 9.
Figure 13:
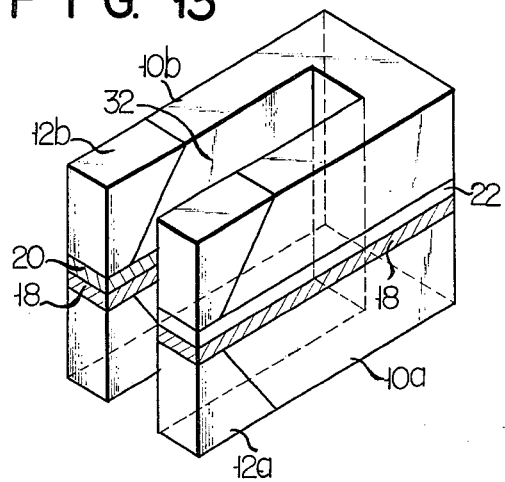
Figure 14:
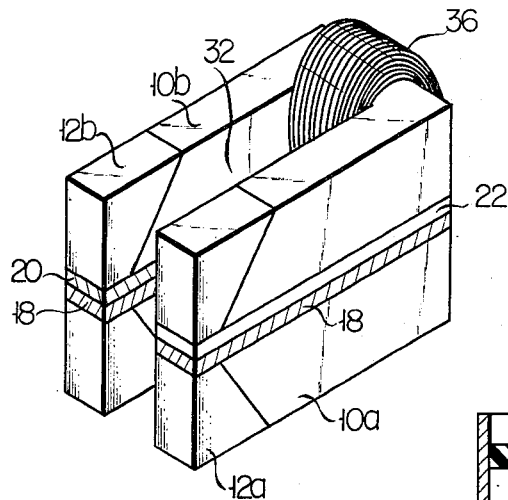

FIG. 10 shows the appearance of a magnetic head 54, which is completed by mounting a tape guide 52 on the construction obtained by the process shown in FIGS. 1 to 9. It resembles a conventional head for a two-channel system at a glance, but it is actually a head for a one-channel system. FIG. 11 shows the magnetic head 54 together with a magnetic tape 56 in frictional contact with the head surface 50 of the head 54. The magnetic thin films 18 and 20 are magnetically coupled to the ferromagnetic block 10 within the shield case 42. As shown in FIG. 9, the coil 36 is wound on the block 10. Thus, when the magnetic potential difference is provided between the upper side thin film $18_1$ and lower side thin films $18_2$ and 20, a magnetic flux is produced within the block 10. Since the magnetic flux links with the coil 36, a voltage corresponding to a change of the aforementioned magnetic potential difference is produced across the coil 36.

The magnetic potential difference is obtained from the gap or distance Wg between the left side end position of the upper thin film $18_1$ and the left side end position of the lower thin film 20 in FIG. 11. Thus, a magnetic pattern $\phi_i$ at a position shifted by the distance Wg with respect to the adjacent magnetic pattern $\phi_i$ is picked up. The patterns $\phi_i$ are magnetized over the full tape width at right angles to the transporting direction of the tape 56. In other words, the distance Wg corresponds to the gap width in the prior-art ring-like head. This distance Wg corresponds to the thickness t20 of the film 20. In other words, the practical resolution of the magnetic head 54 according to the invention is determined by the film thickness t20. As mentioned earlier, as the film thickness t20 it is possible to realize a very small thickness of the order of a fraction of a micron by the film thickness control. Thus, it is possible to achieve reproduction of short wavelength information, which has been almost impossible in practice with a prior-art ring-like head.

The ferromagnetic thin film portion for detecting the magnetic potential difference produced in the tape (i.e., the thin film $18_1$ and thin films $18_2$ and 20 in FIG. 11) can be formed by a suitable method such as sputtering, with which the thickness control can be comparatively readily made. Thus, high precision machining techniques as required in the case of forming the ring-like head gap are unnecessary, so that the head can be readily manufactured.

Further, the thin film portion for detecting the magnetic potential difference produced in the tape may, if necessary, be annealed in the state of the block as shown in FIG. 4, for example. At this time, the reduction of the magnetic permeability is very slight compared to the reduction due to the machining strain in the gap section of the ring-like head.

Figure 15:
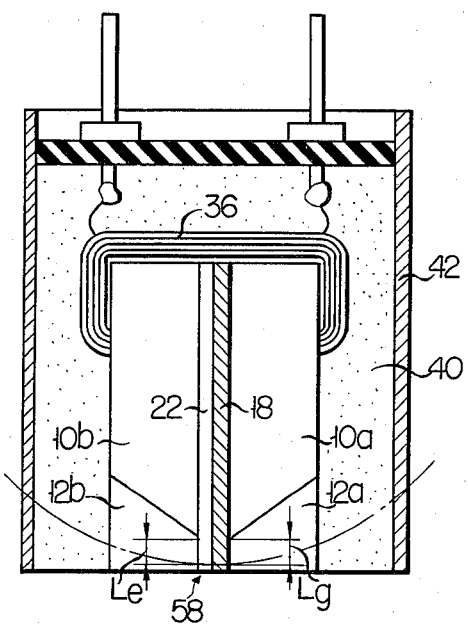

It is to be understood that the specific construction of the embodiment described above and illustrated in the drawings is by no means limitative, and various changes and modifications are possible without departing from the scope and spirit of the invention. For example, the constructions shown in FIGS. 6 to 9 may be respectively replaced by those shown in FIGS. 12 to 15. In the case of FIGS. 12 to 15, a second half 16b similar to the first half 16 of FIG. 2 is used in lieu of the second half 26 in FIG. 5. In other words, first and second block assembly halves 16a and 16b which are bonded together have similar structures. The block 10b in FIGS. 12 to 15 may be of either a non-magnetic or ferromagnetic material. In a case where the block 10b is ferromagnetic, a non-magnetic edge portion 58 as shown in FIG. 15 is necessary. The depth Le of the edge portion need not be equal to the aforementioned distance Lg but should not be too shallow. This is because if the tip of the block 10b senses the magnetic flux of the magnetic tape, the reproduction resolution will be deteriorated.

The invention is further applicable to a multi-channel head for a multi-track system. For example, a two-channel head may be manufactured by inserting two magnetic circuit blocks similar to the block 38 shown in FIG. 8 in piled state into a single shield case and forming the head surface by grinding after securing the head blocks.

Figure 16:
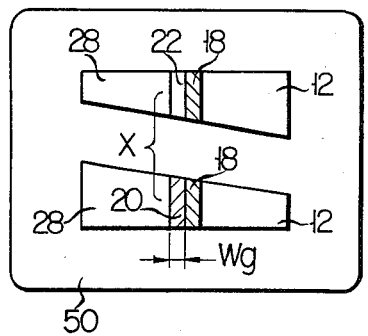
FIG. 16 is a view showing the appearance of the head surface of a head having a slanted notch which is formed instead of the notch 32 in FIG. 7.

Further, the coil 36 may be replaced with another magnetic flux sensing element such as a semiconductor Hall element. Furthermore, the first and second block halves 16 and 26 (or 16a and 16b) need not be rectangular. Moreover, the notch 32 need not be formed to extend normal to the core block 34 but may be slanted with respect thereto. In this case, the appearance of the head viewed from the side of the head surface 50 is, for instance, as shown in FIG. 16.

Although specific constructions have been illustrated and described herein, it is not intended that the invention be limited to the elements and constructions disclosed. One skilled in the art will recognize that other particular elements or subconstructions may be used without departing from the scope and spirit of the invention.

What is claimed is:
1. A magnetic head manufactured by the steps of:
forming a ferromagnetic first thin film on one surface of a first half, said first half including a combination of a first block of a ferromagnetic material and a second block of a non-magnetic material, said one surface including one surface of each of said first and second blocks;
forming a ferromagnetic second thin film and a non-magnetic third film on said first thin film such that said second and third thin films do not overlap each other;

said first half being substantially thicker than each of said first, second and third thin films;

joining a second half to said second and third thin films formed on said first half to form a block assembly, said second half being non-magnetic at least on the side thereof facing said second block of said first half via said first, second and third thin films;

forming a notch in said block assembly, said notch extending along a boundary zone between said first and second thin films to form a core block, said notch separating an end face of said block assembly on the side on which said second block is formed in a direction not parallel to the juncture between said first and second halves with a space in which said boundary zone has been contained;

providing a magnetic flux detecting means in a magnetic path constituted by said core block including said first block; and machining said end face of said block assembly or said core block separated by said notch such that there still remains a surface of said second block continuous with said first thin film and that the resultant shape of the machined surface is suited for frictional contact with a magnetic recording medium.

2. A magnetic head according to claim 1, wherein:

the surface of said first thin film is surface ground before the formation of said second and third thin films thereon;

said second thin film being formed on one half of said surface ground plane of said first thin film; and said third thin film being formed on the remaining half of said surface ground plane of said first thin film spaced apart therefrom by said boundary zone such that said third thin film has substantially the same thickness as said second thin film.

3. A magnetic head according to claim 1, wherein:

the surface of said first thin film is surface ground before the formation of said second and third thin films thereon;

said third thin film being formed on one half of said surface ground plane of said first thin film; and said second thin film being formed on the remaining half of said surface ground plane of said first thin film spaced apart therefrom by said boundary zone such that said second thin film has substantially the same thickness as said third thin film.

4. A magnetic head according to any one of claims 1, 2 or 3, wherein said first, second and third thin films are formed by sputtering.

5. A magnetic head according to any one of claims 1, 2 or 3, wherein before the formation of said block assembly, said first half with said first, second and third thin films formed thereon is given an annealing treatment.

6. A magnetic head according to claim 4, wherein before the formation of said block assembly, said first half with said first, second and third thin films formed thereon is given an annealing treatment.

7. A magnetic head comprising:

a first half including a first block made of a ferromagnetic material and a second block made of a non-magnetic material joined to said first block, said first half having a notch formed therein separating at least said second block into two portions;

a ferromagnetic first thin film formed on a surface of said first half, said surface of said first half including a surface of each of said first and second blocks and having a bay defined by said notch;

a ferromagnetic second thin film and a non-magnetic third thin film formed on said first thin film, said second and third thin films being located opposite to each other with said bay therebetween;

said first half being substantially thicker than each of said first second and third thin films;

a second half forming a core block with said first half, said second half being coupled to said first half with said first, second and third thin films sandwiched between said first and second halves, said second half having at least a non-magnetic portion opposite to said second block, and having a notch therein opposite to said notch of said first half; and a magnetic flux detecting means provided at a magnetic path constituted by said core block including said first block, wherein a magnetic flux based upon a magnetic potential difference between a magnetic potential given from a magnetic recording medium to a portion of said first thin film in contact with said third thin film and a magnetic potential given from said magnetic recording medium to said second thin film at the end face of said core block on said second block side and separated by said notch is converted into an electrical signal by said magnetic flux detecting means.

8. A magnetic head according to claim 7, wherein said second half is made of a material having substantially the same physical properties as the material of said second block.

9. A magnetic head according to claim 7, wherein said second half comprises a third block of a ferromagnetic material joined to a fourth block of a non-magnetic material, and said second half has a structure substantially symmetrical with said first half with respect to said thin films.

10. A magnetic head according to any one of claims 7, 8 or 9, wherein said first thin film has a thickness greater than about 1 micron and less than about 10 microns, and wherein said second thin film has a thickness less than about 1 micron and greater than about 0.1 micron.

11. A magnetic head according to any one of claims 7, 8 or 9, wherein a distance along said first thin film from the termination of the juncture between said first and second blocks continuous to said first thin film to a point in contact with said magnetic recording medium is greater than about 10 microns and less than about 200 microns.

12. A magnetic head according to claim 10, wherein a distance along said first thin film from the termination of the juncture between said first and second blocks continuous to said first thin film to a point in contact with said magnetic recording medium is greater than about 10 microns and less than about 200 microns.

13. A magnetic head having a face for contacting a magnetic recording medium, comprising:

a ferromagnetic first film having one edge which is disposed at said face of the head;

a ferromagnetic second film having one edge which is disposed at said face such that said first film edge is separated from said second film edge and that a first straight line passing through the geometrical center position of said first film edge and the geometrical center position of said second film edge forms a given angle with respect to a second straight line which indicates a running direction of said recording medium relative to the head, said given angle being selected to be about 90 degrees but slightly different from 90 degrees;

magnetic circuit means coupled to said first and second films for magnetically connecting a portion of said first film other than said first film edge to a portion of said second film other than said second film edge;

converter means coupled to said magnetic circuit means for detecting a magnetic flux passing through said magnetic circuit means to provide a reproduced output signal of the head.

* * * * *